C. M. MORRISON.
STOVE TONGS.
No. 187,039.  Patented Feb. 6, 1877.
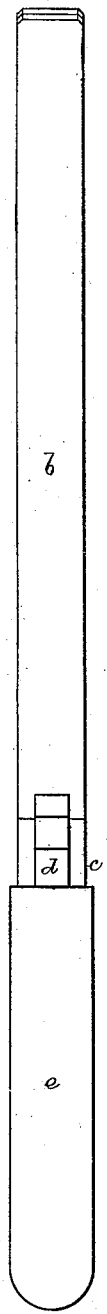
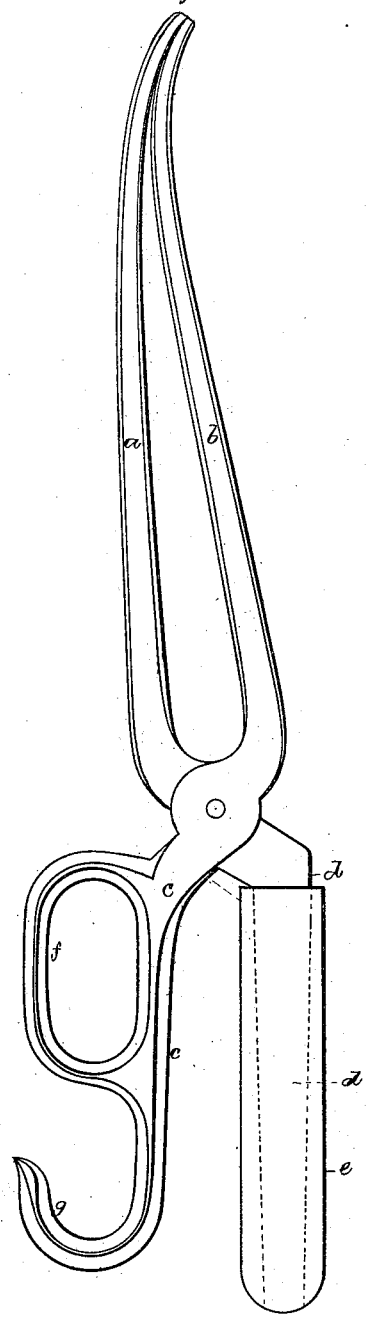
Witnesses.
S. N. Piper
L. H. Miller
Charles M. Morrison
by his attorney
R. H. Eddy.
N. PETERS, PHOTO-LITHOGRAPHER, WASHINGTON, D. C.

UNITED STATES PATENT OFFICE.

CHARLES M. MORRISON, OF NORTH PARSONSFIELD, MAINE.

IMPROVEMENT IN STOVE-TONGS.

Specification forming part of Letters Patent No. 187,039, dated February 6, 1877; application filed January 12, 1877.

*To all whom it may concern:*

Be it known that I, CHARLES M. MORRISON, of North Parsonsfield, of the county of York and State of Maine, have invented a new and useful or Improved Stove-Tongs; and do hereby declare the same to be described in the following specification, and represented in the accompanying drawings, of which—

Figure 1 is a top view, and Fig. 2 a side view, of the tongs embodying my invention.

The stove tongs on which my invention is made have two blades or legs, $a\,b$, pivoted together, and there is a shank, $c$ or $d$, to each of them. There is or may be fixed on one shank a wooden handle, $e$. The other shank has, besides a finger-receiving eye, $f$, a hook, $g$, arranged with it, as represented.

This hook will be found very convenient for lifting covers from either pots or stove-holes, as well as for other purposes.

I do not claim the stove tongs irrespective of the hook arranged with one of the shanks and the eye thereof, as shown.

What I claim as my invention is—

The stove-tongs, substantially as described, viz., as provided with the hook $g$, the eye $f$, the shanks $c\,d$, and the blades or legs $a\,b$, arranged and combined as set forth.

CHARLES M. MORRISON.

Witnesses:
R. H. EDDY,
J. R. SNOW.